United States Patent
Simard et al.

(10) Patent No.: US 6,922,532 B2
(45) Date of Patent: Jul. 26, 2005

(54) OPTICAL PERFORMANCE MONITORING FOR D/WDM NETWORKS

(76) Inventors: Frederic Simard, 7 Hexman Road, Nepean, Ontario (CA), K2H 5L2; David W. Park, 198 Walden Drive, Kanata, Ontario (CA), K2K 2K7

( * ) Notice: Subject to any disclaimer, the term of this patent is extended or adjusted under 35 U.S.C. 154(b) by 798 days.

(21) Appl. No.: 09/730,550

(22) Filed: Dec. 7, 2000

(65) Prior Publication Data

US 2002/0114062 A1 Aug. 22, 2002

(51) Int. Cl.[7] .................. H04B 10/08; H04B 10/00; H04B 10/12
(52) U.S. Cl. .............. 398/177; 398/25; 398/30; 398/33; 398/37; 398/38; 398/160; 398/162; 359/337.11; 359/337.12; 359/337.13; 359/341.2; 359/341.4
(58) Field of Search ................. 398/25, 26, 27, 398/37, 38, 160, 162, 177, 30, 180, 181, 124; 359/337.11, 337.12, 337.13, 341.4, 341.41, 341.42, 333, 377.5, 341.2

(56) References Cited

U.S. PATENT DOCUMENTS

| 5,513,029 A | | 4/1996 | Roberts ................ 359/177 |
| 5,822,094 A | * | 10/1998 | O'Sullivan et al. ......... 398/18 |
| 5,963,312 A | * | 10/1999 | Roberts ................ 356/73.1 |
| 5,969,840 A | * | 10/1999 | Roberts ................. 398/32 |
| 6,111,676 A | * | 8/2000 | Lemus et al. ............ 398/1 |
| 6,134,034 A | * | 10/2000 | Terahara ................ 398/1 |
| 6,222,652 B1 | * | 4/2001 | Roberts ................. 398/25 |
| 6,233,076 B1 | * | 5/2001 | Iwata et al. ............ 398/14 |
| 6,441,950 B1 | * | 8/2002 | Chen et al. ............ 359/334 |
| 6,476,961 B1 | * | 11/2002 | Ye et al. ............ 359/341.43 |

FOREIGN PATENT DOCUMENTS

| EP | 0 926 849 A2 | 6/1999 | ........ H04B/10/17 |
| GB | 2 343 314 A | 5/2000 | ........ H04J/14/02 |

\* cited by examiner

Primary Examiner—M. R. Sedighian
(74) Attorney, Agent, or Firm—Ridout & Maybee LLP

(57) ABSTRACT

A performance monitoring method for an optically amplified transmission system. The method provides the optical power at each amplifier site, taking into account the inaccuracies introduced by the SRS in the power estimation obtained with the current methods. An optical spectrum analyzer is used at the output of the transmission link of interest to accurately measure the output power of each wavelength. This value is sent upstream to the last amplifier in the link, to compute an error term as the difference between the actual measurement and the estimation. The error term is used to infer the SRS-induced error by system elements not accounted for in the model. The error term is then fed-back to each amplifier in the link, so that the estimated power is adjusted to account for the SRS-induced inaccuracy.

16 Claims, 3 Drawing Sheets

OPTICAL PERFORMANCE MONITORING FOR D/WDM NETWORKS

BACKGROUND OF THE INVENTION

1. Field of the Invention

This invention relates to optical transmission systems, and in particular to optical performance monitoring for wavelength division multiplexed (WDM) and dense WDM (DWDM) networks.

2. Background Art

Performance monitoring (PM) refers to in-service, non-intrusive monitoring of transmission quality (GR-253-CORE, issue 2, December 1995). Performance monitoring provides indications regarding the success of attempts to solve a problem, allows to isolate and resolve the problem before it affects traffic, and to determine the entity responsible with the equipment affecting adversely the traffic quality.

The signal power of an optical channel has proved to be one of the most important factors in controlling the performance of an amplified optical network. Firstly, attenuation or transmission loss determines the maximum transmission distance before signal restoration is necessary. Equally important for D/WDM long reach transmission is the equalization of channels, which is necessary for optimal BER performance. Equalization means that all channel co-propagating along a fiber must have substantially similar optical signal-to-noise ratios at their respective receivers.

A number of mechanisms are responsible for the signal attenuation within optical fibers. For a given type of fiber, there are a number of factors that influence these mechanisms. Thus, signal attenuation depends, inter alia, on the distance of the signal travelling along the fiber, launch power, and the number of the co-propagating channels (wavelengths).

These mechanisms are influenced by the material composition of the transmission medium, the preparation and purification technique, and the waveguide structure. They may be categorized within several major areas which include material absorption, material scattering (linear and non-linear scattering) curve and micro-bend losses, mode coupling radiation losses, and losses due to leaky modes. Material scattering becomes an important problem at high powers and large number of wavelengths propagating along the same span of fiber.

Non-linear material scattering losses become especially important as the bandwidth (number of channels and the rate of the channels) and distance of the information transmitted over the fiber increases. Non-linear scattering causes the optical power from one mode to be transferred in either the forward or backward direction to the same, or other modes, at a different frequency. It depends critically on the optical power density within the fiber and hence it becomes significant above threshold power levels. The most important types of non-linear scattering are stimulated Brillouin and Raman scattering, both of which are usually only observed at high power densities. These scattering mechanisms in fact give optical gain, but with a shift in frequency, thus contributing to attenuation for light transmission at a specific wavelength.

Of interest to this invention is stimulated Raman scattering (SRS). Raman scattering is a non-linear phenomenon attributed to the modulation of light through thermal molecular vibrations within the fiber. SRS results in the energy from short wavelengths being transferred to longer wavelengths, which results in cross-talk between the channels in D/WDM systems. To become significant, the launch power must exceed a given threshold dependent on the medium (fiber).

A very effective way of monitoring performance of an end-to-end transmission link is the 'analog maintenance-1 (AM-1)' method used in the Applicant's transmission systems. This method is described in U.S. Pat. No. 5,513,029 (Roberts, issued Apr. 30, 96 and assigned to Nortel Networks Corporation), which is incorporated herein by reference.

AM-1 involves amplitude modulating at the transmitter side each channel with a specific pseudo-random dither signal, the dither having a known modulation depth. For each channel, the receiver estimates the power of the received dither and determines the power received on the respective channel using the known modulation depth and the launch power.

However, application of this method to high-speed D/WDM networks is limited because of complexity of the circuitry needed to detect the dithers for each channel, when an increased number of optical carriers share a relatively narrow portion of the spectrum.

Analog maintenance-2 (AM-2) is used by the Applicant for D/WDM networks with a larger number of channels. This method is the object of U.S. patent application Ser. No. 09/539,706 (Harley et al. filed Mar. 31, 2000 and assigned to Nortel Networks Corporation). The above-identified patent application is incorporated herein by reference.

AM-2 provides for modulating each channel with a distinct pulse (digital) sequence, where the RMS of the modulation is proportional to the average power of the respective channel. The far-end receiver recovers the pulse modulation and determines the RMS of the modulation for each channel. The channel power is then estimated based on the modulation depth (known) and the RMS value for the respective channel.

In general, systems with no more than 20 channels are negligibly affected by the SRS, so that AM-2 performance monitoring method can be used without any SRS compensation. However, at very high speeds and systems having over 20 transmission channels, SRS induces Inaccuracies In the power estimate provided by AM-2. The SRS-Induced inaccuracy can be conceptually expressed in the following equation (EQ1) as:

$$AM_{error} \propto \log\left(1 + \frac{g' \cdot \Delta\lambda \cdot P_0 \cdot N_{ch}(N_{ch}-1) \cdot N_{sp}}{2\alpha}\right) \quad \text{EQ 1}$$

$AM_{error}$ is the SRS induced in accuracy (in dB), g' is the Raman gain (inversely proportional to the effective area of fiber), $\Delta\lambda$ is the spread of wavelengths (in nanometers), $P_o$ is the launch power, $N_{ch}$ is the number of channels, $N_{sp}$ is the number of spans, and $\alpha$ is the fiber attenuation.

EQ1 shows that the SRS-induced inaccuracy becomes more significant as the number of wavelengths, the launched power, the number of spans and the wavelength spread increase. It is also to be noted that the inaccuracy increases proportionally with the squared number of wavelengths.

SRS-induced AM-2 power measurement inaccuracy can be addressed using a spectrum analyzer. Optical spectrum analyzers are non-obtrusive and not susceptible to SRS, resulting in a better equalization of complex systems in which SRS is significant. When using a spectrum analyzer, AM-2 method is still very useful, in that it provides wavelength identification (wave ID) and optical reflectometer functionality. On the other hand, the optical spectrum analyzer needs to be tightly integrated into the central network management systems. Furthermore, this is a very expensive piece of equipment.

There is a need to provide a reliable method of measuring the power of a channel in high-speed D/WDM system, which accounts for the characteristics of the transport medium and for the inaccuracy introduced by the elements present in the network.

SUMMARY OF THE INVENTION

It is an object of this invention to provide a method for compensating for the inaccuracy introduced by the SRS in the current performance monitoring methods.

The compensation model used by the method according to the invention is derived from the analytical model of SRS with simplifying assumptions for implementation considerations. The method is in principle of a 'closed loop' type. Namely, the method provides for an accurate measurement of a parameter(s) of interest at the output of a transmission link, and corrects the estimated values given by the existing monitoring methods of the parameter(s) at each node, in reverse order starting with the output node.

According to one aspect of the invention, there is a performance monitoring method for an optically amplified transmission system comprising, at an optical amplifier $A_j$ of an optical transmission link, providing an estimated value $P_j$ for an optical parameter of an optical signal of interest, where j is an integer between 1 and N, providing a measured value $O_{N+1}$ for said optical parameter at the output of said optical link, and at said optical $A_j$, determining a compensated value $O_j$ for said parameter based on said estimated value $P_j$ and said measured value $O_{N+1}$.

In yet another aspect of the invention there is an optical amplifier comprising, an optical amplifying module connected in an optical transmission link for amplifying an input optical signal to an output optical signal, a power estimator for providing an estimated value $P_j$ for the optical power of said optical signal; a compensation model for receiving said estimated value $P_j$ and an error term $E_{j+1}$ and providing said adjustment value $Ad_j$ and a local error term $E_j$, and a calculation arrangement for receiving said estimated value $P_j$, said error term $E_{j+1}$ and an adjustment value $Ad_j$, and determining a compensated value $O_j$ for said optical power.

In yet a further aspect of the invention, there is an optical transmission link between a transmitting and a receiving terminal, comprising, a plurality of optical amplifiers $A_1 \ldots A_j \ldots A_N$ connected in series between said transmitting and receiving terminals, at said receiving terminal, providing a measured value $O_{N+1}$ for an optical parameter of interest and transmitting said measured value to a last optical amplifier $A_N$ in said link, at said last optical amplifier $A_N$, receiving said measured value $O_{N+1}$ and determining a local error term $E_N$ and a compensated value $O_N$ for said parameter, and at each optical amplifier $A_j$, receiving an error term $E_{j+1}$ and determining a local error term $E_j$ and a compensated value $O_j$ for said parameter, where j is an integer between 1 and N and gives the sequential position of said optical amplifier in the link.

The performance monitoring method according to the invention sufficiently decreases the current power estimation inaccuracy to yield acceptable equalization in many systems, and sufficiently compensates for the SRS-induced inaccuracies for systems with more than 20 channels. As a result, the compensation of the SRS induced error according to the invention extends the bandwidth and the transmission distance of the communication link.

In addition, the compensation method accounts for characteristics of the transport medium such as fiber type, fiber attenuation, number of wavelengths, number of spans, launch power, etc. It also accounts for the inaccuracy introduced by the elements present in the network, such as optical amplifiers, DCM (dispersion compensation module), etc. It results in a more robust estimation of power than the previous methods, and less sensitivity to system variables.

Furthermore, the method requires only one OSA for unidirectional system for two OSAs for bidirectional systems.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

Figure 1A:
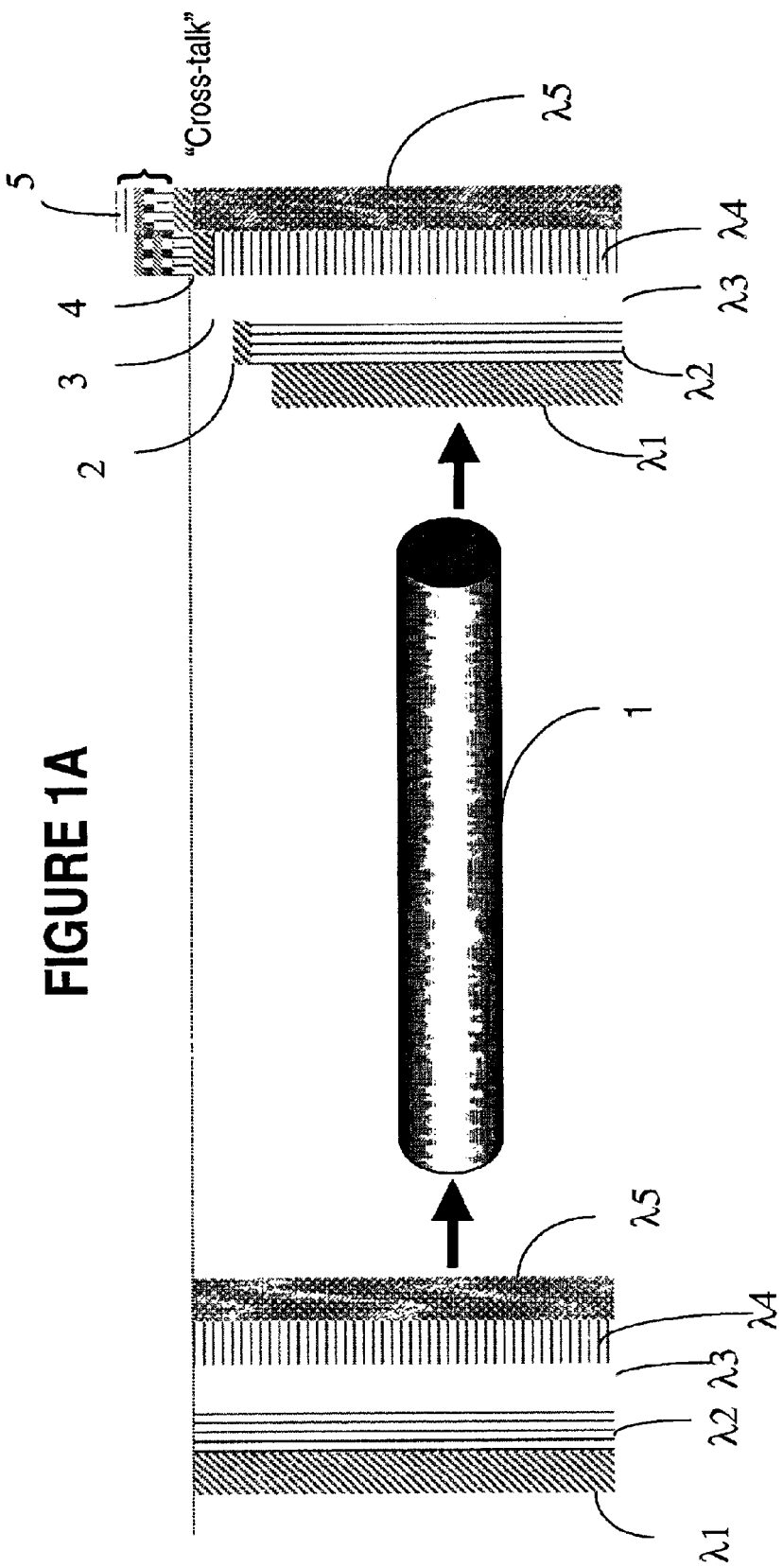
FIG. 1A illustrates the SRS mechanism.

FIG. 1A illustrates intuitively how cross-talk between wavelengths occur due to SRS, for a five-channel example. It shows that all channels λ1–λ5 have the same power at the input side of fiber 1, and how power is transferred towards higher frequencies at the output of the fiber 1. Thus, channel λ2 has some information, denoted with 2, transferred through SRS from channel λ1, and channel λ3 carries some information, denoted with 3, transferred from channels λ1 and λ2 through SRS. The information denoted with 4 was transferred on channel λ4 from channels λ1, λ2 and λ3, and the information denoted with 5, was transferred on channel λ5 from channels λ1, λ2, λ3 and λ4.

It is evident on FIG. 1A that the cross-talk component on the higher wavelengths becomes larger as the number of channels grows. This is also consistent with EQ1.

Figure 1B:
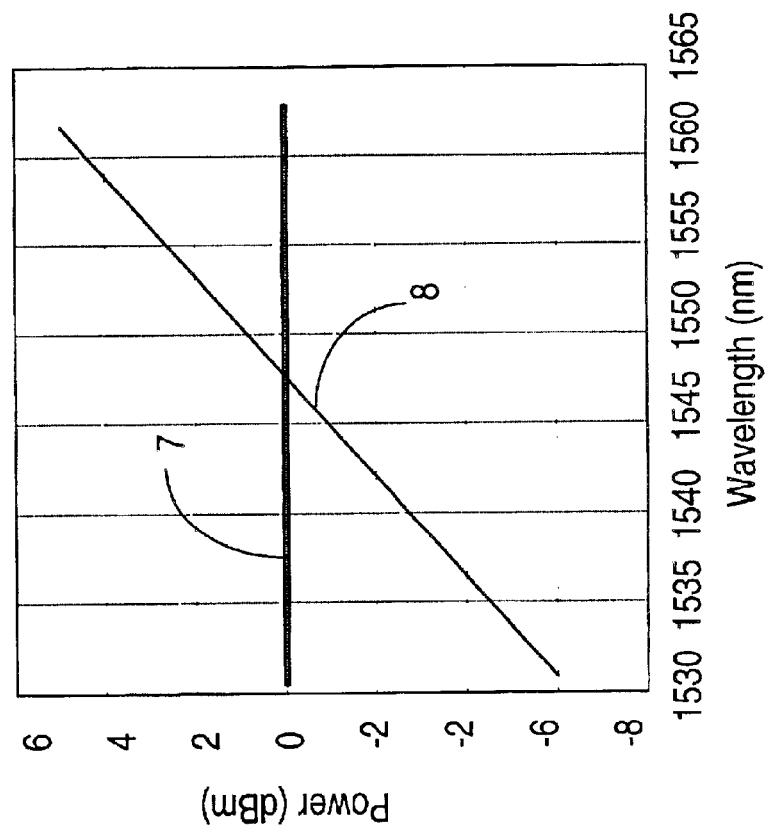
FIG. 1B is a graph showing the AC and DC transfer functions for a non-dispersion shifted fiber (NDSF), six spans.

FIG. 1B shows the AC and DC power/wavelength transfer functions for a six-span link using non-shifted dispersion fiber (NSDF). The AC transfer function is denoted with 7, and the DC transfer function is denoted with 8. It is clear from this graph that the DC power varies proportionally with the wavelength.

Figure 2:
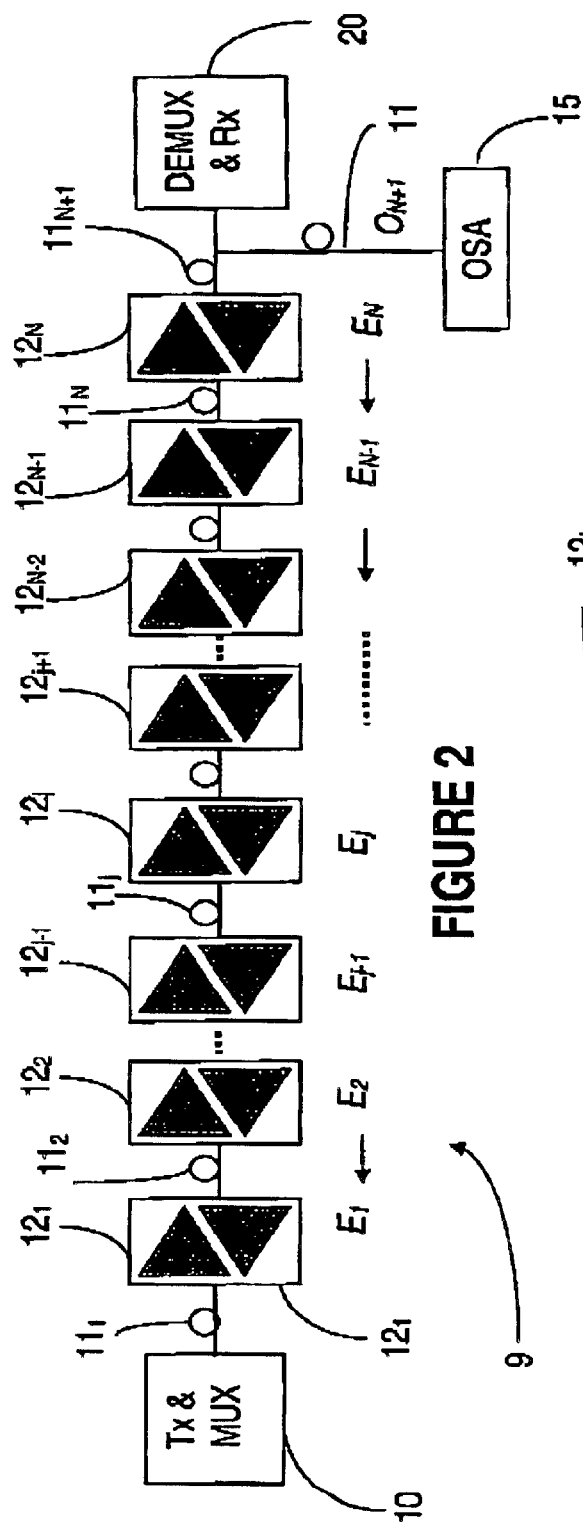
FIG. 2 is a block diagram of an amplified optical link with AM-2 error compensation.

FIG. 2 illustrates an amplified optical link 9 provided between a transmitter terminal 10 and a receiver terminal 20, including a chain of N optical amplifiers $12_1, 12_2 \ldots 12_N$. Transmitter terminal 10 comprises a plurality of wavelength transmitters that modulate a plurality of channels with the respective information, and a multiplexer that combines the channels into a multichannel signal. In general, an optical service channel (OSC) travels along the same fiber with the information channels. Receiver terminal 20 comprises a demultiplexer for receiving the multichannel signal and separating the channels and a plurality of wavelength receivers for recovering the information from each respective channel.

Link 9 is bidirectional, as shown by the symbol used for illustrating the optical amplifiers. However, for the sake of simplification, the method of the present invention is described explicitly only for the West-East direction of traffic, similar operations and considerations apply evidently for the East-West direction of traffic. For W-E direction of traffic, optical amplifier $12_{j-1}$ is defined as being upstream from optical amplifier $12_j$, and optical amplifier $12_{j+1}$ is defined as being downstream from optical amplifier $12_j$. Again, for the sake of simplification we will discuss the applicability of the invention for one channel only. Similar operations are performed for all channels travelling along link 9.

The fiber span between the transmitter terminal 10 and the first optical amplifier $12_1$ is denoted $11_1$ and the span between the last optical amplifier $12_N$ and the receiver terminal 20 is denoted with $11_{N+1}$. In general, a space between any two successive amplifiers $12_{j-1}$ and $12_j$ is denoted with $11_j$. FIG. 2 does not explicitly illustrate elements such as splitters and couplers (use e.g. to connect the optical amplifiers to the fiber), dispersion compensating modules, attenuators and/or other elements that may be coupled in link 9.

Each optical amplifier $12_j$ is provided with means for estimating the power according to AM-2 system, as disclosed in the above-mentioned patent application Ser. No. 09/539,706 (Harley et al.). It is to be understood that the amplifiers may be equipped with other means for estimating the power and that the present invention is not limited to correcting the estimates obtained with the AM-2 method. The present invention may be used in combination with other power estimation methods that do not account for the inaccuracies induced by the SRS. We denote this estimated power with $P_j$.

According to the method of the invention, an optical spectrum analyzer (OSA) 15 is used in the last span $11_{N+1}$ to measure the actual power of each wavelength. We use notation $O_{N+1}$ for the power measured by OSA 15 for a certain channel at the output of the link for West-East direction. As discussed, this value measured with OSA 15 gives the channel power at the end of the link with accuracy, while the analog maintenance AM-2 provide in general an estimate of the power at each amplifier site.

Optical amplifier $12_N$ determines an error term $E_N$ as the difference between the measured value $O_{N+1}$ and the estimated power $P_N$, and provides this error term to the upstream optical amplifier $12_{N-1}$ over span $11_N$.

Optical amplifier $12_{N-1}$ makes the respective correction to the power $P_{N-1}$, to obtain a compensated value $O_{N+1}$, and also calculates a local error term $E_{N-1}$ for the upstream optical amplifier $12_{N-2}$.

As such, the compensation operates upstream from the direction of the traffic. In general, each optical amplifier $12_j$ in link 9 receives an error term $E_{j+1}$ from the downstream amplifier $12_{j+1}$ and determines an estimated power $P_j$ according to the AM-2 or other power estimation method. The error term and the power estimate are used to determine an adjustment value $Ad_j$ used to calculate the compensated value power $O_j$ at that site. Also, each optical amplifier $A_j$ calculates the error term $E_j$ for the upstream optical amplifier $12_{j-1}$. Upstream optical amplifier $12_{j-1}$ receives $E_j$ on a reverse channel.

When combined with AM-2, the compensation method of the invention can be used for transmission links with a relatively small number of spans.

The error term is generated using an SRS compensation model to infer SRS-induced error by system elements non-accounted for in the current methods. The objective is to drive the first error term $E_1$ to zero ($E_1$=0). In this way, the SRS error, as measured by OSA 15 at the output of the transmission link will be fully accounted for each span.

Figure 3:
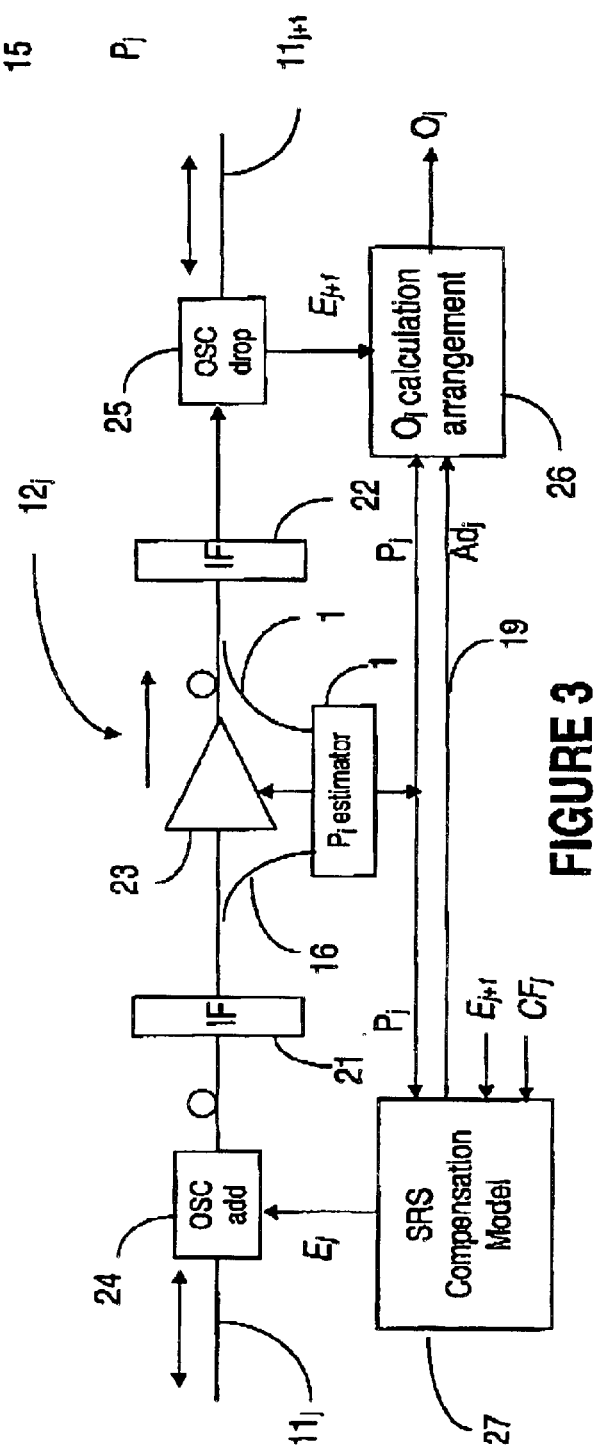
FIG. 3 shows a block diagram of an optical amplifier provided with the SRS compensated AM-2 system.

FIG. 3 show a block diagram of optical amplifier $12_j$ illustrating only the blocks of interest for the method according to the present invention. Although an optical amplifier generally comprises forward and reverse amplifying units, the block diagram illustrates only the blocks pertinent for the West-East direction of transmission for simplification. FIG. 3 intuitively illustrates separation of traffic according to the direction of flow, using optical interfaces (IF) 21 and 22. Interfaces 21 and 22 could be for example optical couplers or circulators, etc.

The optical amplifier $12_j$ comprises an optical amplifying module 23 optically coupled to input span $11_j$ and output span $11_{j+1}$ through interfaces 21 and 22. Amplifying unit 23 is provided with optical taps 16 and 18 that sample the multichannel signal at the input and output of optical amplifier module 23. The sample is usually a 2–3% fraction of the multichannel optical signal. The input and output tapped fractions are then used by a $P_j$ estimator 17 to determine the estimated power $P_j$ for each channel, as per AM-2 or other power estimating systems. It is to be understood that $P_j$ estimator 17 provides the estimated power $P_j$ for each channel of the multichannel signal travelling along spans $11_j$ and $11_{j+1}$. However, as indicated above, FIG. 3 shows the units pertinent to one channel only for simplification.

In this embodiment, the error term $E_{j+1}$ is received from the downstream amplifier $12_{j+1}$ over a bidirectional optical service channel (OSC), which is generally present in all optical transmission systems for transmitting control and monitoring information between amplifier sites. An amplifier unit is equipped with means for demultiplexing the OSC from the fiber and extracting the information of interest for the respective optical amplifier. FIG. 3 shows OSC drop unit 25 which extracts the error term information $E_{j+1}$ received over the east-west OSC channel at amplifier $12_j$ from the downstream optical amplifier $12_{j+1}$. It is to be understood that the error term can be provided to optical amplifier $12_j$ using other means than OSC.

Error term $E_{j+1}$ is used to correct the estimated power $P_j$. FIG. 3 illustrates an $O_j$ calculation arrangement 26, which receives the estimated power $P_j$, an adjustment value $Ad_j$, and the error term $E_{j+1}$ to provide the compensated power $O_j$, as a measure of the power at the output of optical amplifier $12_j$. As indicated above, optical amplifier $12_j$ determines the power $P_j$ and the compensated power $O_j$ for all channels, the compensated power $O_j$ being then used for example for equalization of span $11_j$.

A SRS compensation model 27 provides the local error term $E_j$ and adjustment value $Ad_j$. Namely, error term $E_j$ is determined by adjusting $E_{j+1}$ according to estimated power $P_j$ and also taking into account compensating factors $CF_j$ available at the amplifier $12_j$ site and specific to that site. For example, $CF_j$ may include pertinent network provisioning data such as the position of the amplifier $12_j$ in the link, the length of spans $11_1$ to $11_j$, the launch power, the number of wavelengths, the band.

The local error term $E_j$ is added back in the OSC, and transmitted over the East-West fiber/direction as shown by unit 24, so that the upstream amplifier $12_{j-1}$ could receive it to perform a similar compensation operation.

Figure 4:
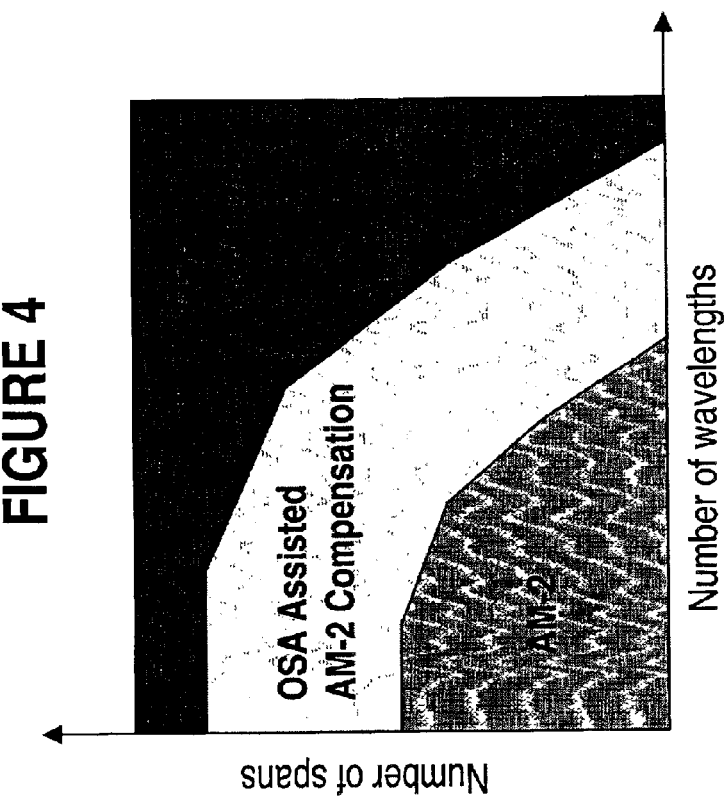
FIG. 4 shows compensation model coverage.

FIG. 4 shows compensation model coverage.

In general, for a small number of wavelengths (e.g. 20) and of spans, the optical amplifiers can be controlled using the estimated power according to AM-2, since the estimation is sufficiently accurate for the application.

As the number of channels and of spans grow, the SRS induced AM-2 inaccuracy degrades the link budget. The estimated power derived should therefore be adjusted using the compensation system according to this invention.

As seen on FIG. 4, at even larger numbers of channels and spans, the only accurate method of measuring the power remains the optical spectrum analyzer (OSA).

While the invention has been described with reference to particular example embodiments, further modifications and improvements which will occur to those skilled in the art, may be made within the purview of the appended claims, without departing from the scope of the invention in its broader aspect.

We claim:

1. A performance monitoring method for an optically amplified transmission system comprising:
    at an optical amplifier $A_j$ of an optical transmission link, providing an estimated value $P_j$ for an optical parameter of an optical signal of interest, where j is an integer between 1 and N;
    receiving an error term $E_{j+1}$ from a downstream optical amplifier $A_{j+1}$;
    providing an adjustment value $Ad_j$ and a local error term $E_j$ from a compensation model using said estimated value $P_j$ and said error term $E_{j+1}$; and
    at said optical amplifier $Ad_j$, determining a compensated value $O_j$ for said parameter based on said estimated value $P_j$, said error term $E_{j+1}$ and said adjustment value $Ad_j$.

2. A method as claimed in claim 1, wherein said optical parameter is the optical power.

3. A method as claimed in claim 2, wherein said step of providing an estimated value $P_j$ comprises:
    diverting a fraction of said optical signal at said optical amplifier $A_j$;
    separating from said fractions an overhead signal and measuring the RMS of said overhead signal; and
    estimating the optical power of said optical signal using said RMS value and a known modulation depth of said overhead signal.

4. A method as claimed in claim 3, wherein said step of separating comprises converting said fraction into an electrical signal and detecting components of said overhead signal in said electrical signal.

5. A method as claimed in claim 4, wherein the step of estimating comprises measuring the DC value of said electrical signal, determining the modulation depth of said overhead signal by dividing said RMS value by said DC value, and evaluating the optical power based on said modulation depth.

6. A method as claimed in claim 1, wherein said providing said adjustment value step uses compensation model including one or more correction factors.

7. A method as claimed in claim 1, further comprising transmitting said local error term $E_j$ to an upstream amplifier $A_{j-1}$.

8. A method as claimed in claim 7, wherein said step of transmitting comprises inserting said local error term $E_j$ on a channel travelling in a direction opposite to said optical signal.

9. An optical amplifier comprising:
    an optical amplifying module connected in an optical transmission link for amplifying an input optical signal to an output optical signal;
    a power estimator for providing an estimated value $P_j$ for the optical power of said optical signal;
    a compensation model for receiving said estimated value $P_j$ and an error term $E_{j+1}$ and providing an adjustment value $Ad_j$ and a local error term $E_j$; and
    a calculation arrangement for receiving said estimated value $P_j$, said error term $E_{j+1}$ and an adjustment value $Ad_j$, and determining a compensated value $O_j$ for said optical power.

10. An optical amplifier as claimed in claim 9, wherein said compensation model accounts for at least the type of fiber used for said link, the launch power at the input of said link and the sequential position of said optical amplifier in said link.

11. An optical amplifier as claimed in claim 9, wherein said error term $E_{j+1}$ is received from one of a downstream amplifier and a receiving terminal at the output of said link.

12. An optical amplifier as claimed in claim 9, wherein said error term $E_{j+1}$ is received over a reverse optical supervisory channel (OSC).

13. An optical amplifier as claimed in claim 9, wherein said local error term $E_j$ is transmitted to one of an upstream amplifier and a transmit terminal at the input of said link.

14. An optical amplifier as claimed in claim 9, wherein said local error term $E_j$ is transmitted over a reverse optical supervisory channel (OSC).

15. An optical transmission link between a transmitting and a receiving terminal, comprising:
    a plurality of optical amplifiers $A_1 \ldots A_j \ldots A_N$ connected in series between said transmitting and receiving terminals;
    at said receiving terminal, providing a measured value $O_{N+1}$ for an optical parameter of interest and transmitting said measured value to a last optical amplifier $A_N$ in said link;
    at said last optical amplifier $A_N$, receiving said measured value $O_{N+1}$ and determining a local error term $E_N$ and a compensated value $O_N$ for said parameter; and
    at each optical amplifier $A_j$, receiving an error term $E_{j+1}$ from the downstream optical amplifier $A_{j+1}$ and determining a local error term $E_j$ and a compensated value $O_j$ and a compensated value $O_j$ for said parameter,
    where j is an integer between 1 and N and gives the sequential position of said optical amplifier in the link.

16. An optical transmission link as claimed in claim 9, wherein said error term is transmitted between said optical amplifiers and said terminals over a reverse optical supervisory channel (OSC).

* * * * *